United States Patent
Oguri et al.

(10) Patent No.: US 6,899,783 B2
(45) Date of Patent: May 31, 2005

(54) METHOD OF MANUFACTURING FRICTION PLATE FOR WET CLUTCH

(75) Inventors: Kensuke Oguri, Shizuoka (JP); Tsutomu Tsuboi, Shizuoka (JP)

(73) Assignee: Kabushiki Kaisha, F.C.C., Shizuoka (JP)

( * ) Notice: Subject to any disclaimer, the term of this patent is extended or adjusted under 35 U.S.C. 154(b) by 0 days.

(21) Appl. No.: 10/736,891

(22) Filed: Dec. 17, 2003

(65) Prior Publication Data

US 2004/0154735 A1 Aug. 12, 2004

(30) Foreign Application Priority Data

Dec. 17, 2002 (JP) ........................................ 2002-365712

(51) Int. Cl.[7] .............................................. B32B 31/00
(52) U.S. Cl. ................... 156/259; 156/263; 156/265; 156/271; 156/299; 156/512; 156/522; 156/560; 188/18 A; 188/218 XL; 188/264 B; 188/264 D; 188/264 R; 192/70.12; 192/70.14; 192/107 R; 192/43.36; 29/417
(58) Field of Search ........................ 188/18 A, 218 XL, 188/264 B, 264 D, 264 R; 192/70.12, 70.14, 107 R, 43.36; 29/412, 417; 156/259, 263, 265, 271, 299, 512, 522, 560

(56) References Cited

U.S. PATENT DOCUMENTS

| | | | | |
|---|---|---|---|---|
| 4,260,074 A | * | 4/1981 | Cerrato ........................... | 222/1 |
| 4,878,282 A | | 11/1989 | Bauer | |
| 5,094,331 A | * | 3/1992 | Fujimoto et al. ........ | 192/70.12 |
| 5,454,454 A | | 10/1995 | Easton et al. | |
| 5,460,255 A | * | 10/1995 | Quigley ................. | 192/113.36 |
| 5,571,372 A | * | 11/1996 | Miyaishi et al. ............ | 156/515 |
| 5,776,288 A | * | 7/1998 | Stefanutti et al. ........... | 156/263 |
| 5,897,737 A | * | 4/1999 | Quigley ...................... | 156/265 |
| 6,370,755 B1 | * | 4/2002 | Wakamori .................... | 29/412 |
| 6,500,294 B1 | * | 12/2002 | Honda et al. ............... | 156/265 |
| 6,572,726 B2 | * | 6/2003 | Shimoi et al. .............. | 156/265 |
| 6,596,119 B2 | * | 7/2003 | Honda et al. ............... | 156/265 |
| 6,601,684 B2 | * | 8/2003 | Collis et al. ............ | 192/107 R |

FOREIGN PATENT DOCUMENTS

| | | |
|---|---|---|
| EP | 0 806 586 A2 | 11/1997 |
| JP | 2-3716 | 1/1990 |
| JP | 6-300051 | 10/1994 |
| JP | 7-151175 | 6/1995 |

* cited by examiner

Primary Examiner—Linda Gray
(74) Attorney, Agent, or Firm—Arent Fox

(57) ABSTRACT

In order to manufacture a friction plate for a wet clutch including a core plate and a friction member bonded to at least one of annular flat surfaces of the core plate, each friction member including friction member segments, an oil groove being provided between adjacent friction member segments, there is adopted a method including: a step of making a plurality of cuts in at least one band-shaped friction member material in a lengthwise direction to form a plurality of friction member strips; a step of retaining the friction member strips with distances corresponding to the oil grooves being formed between adjacent friction member strips; a step of cutting off a portion of a tip end of at least one of the friction member strips which are located at opposite ends to thereby secure the oil grooves between the friction member segments on the annular flat surface; and a step of superposing friction member segment correspondence portions forming the tip ends of the plurality of friction member strips to the annular flat surface of the core plate having an adhesive applied thereto, and cutting the friction member segment correspondence portions away from the remaining portions of the friction member strips.

1 Claim, 19 Drawing Sheets

METHOD OF MANUFACTURING FRICTION PLATE FOR WET CLUTCH

BACKGROUND OF THE INVENTION

1. Field of the Invention

The present invention relates to a method of manufacturing a friction plate for a wet clutch.

2. Description of the Related Art

There is such a conventionally known friction plate including an annular core plate and friction members bonded to opposite annular flat surfaces of the annular core plate, each friction member comprising a plurality of friction member segments disposed on the annular flat surface, an oil groove being provided between adjacent friction member segments.

In this case, to bond the plurality of friction member segments to the annular flat surface of the annular core plate, a method is adopted which includes steps of subjecting a band-shaped friction member material to a punching treatment to form friction member segments and bonding the friction member segments one by one to the annular flat surface (for example, see Japanese Patent Application Laid-open Nos. 7-151175 and 6-300051).

With the conventional method, however, there is a problem that the yield in the fabrication of the friction member segments is low, resulting in a poor economy.

SUMMARY OF THE INVENTION

Accordingly, it is an object of the present invention to provide a method of manufacturing a friction plate of the above-described type for a wet clutch, which has a good productivity, wherein the yield in the fabrication of the friction member segments can be increased, and the degrees of freedom of the width and shape of oil grooves can be increased.

To achieve the above object, according to the present invention, there is provided a method of manufacturing a friction plate for a wet clutch which includes an annular core plate and a friction member bonded to at least one of annular flat surfaces of the annular core plate, each friction member comprising a plurality of friction member segments disposed on the annular flat surface, an oil groove being provided between adjacent friction member segments, wherein the following steps are adopted to bond the plurality of friction member segments simultaneously to the annular flat surface of the annular core plate: a step of making a plurality of cuts in at least one band-shaped friction member material in a lengthwise direction to form a plurality of friction member strips; a step of retaining the friction member strips with distances corresponding to the oil grooves being formed between adjacent friction member strips; a step of cutting off a portion of a tip end of at least one of the friction member strips which are located at opposite ends to thereby secure the oil grooves between the friction member segments on the annular flat surface; and a step of superposing friction member segment correspondence portions forming the tip ends of the plurality of friction member strips to the annular flat surface of the core plate having an adhesive applied thereto, and cutting the friction member segment correspondence portions away from the remaining portions of the friction member strips.

If the above means is adopted, the cutting for forming the friction member strips, the cutting-off for securing the oil grooves and the cutting-away of the friction member segment correspondence portions from the remaining portions of the friction member strips can be carried out using cutting edges, respectively. Thus, when the friction member segments are fabricated from the friction member strips, scraps produced can be limited to those produced by the cutting-off, to thereby increase the yield in the fabrication of the friction member segments.

The width of each of the oil grooves can be changed freely by changing the distance between the adjacent friction member strips, and the shapes of the oil grooves can be also changed by changing the shapes of the cuts in the formation of the friction member strips. Moreover, the plurality of friction member segments are bonded simultaneously to the core plate, which is effective for improving the productivity for the friction plate.

DESCRIPTION OF THE PREFERRED EMBODIMENTS

Figure 1:
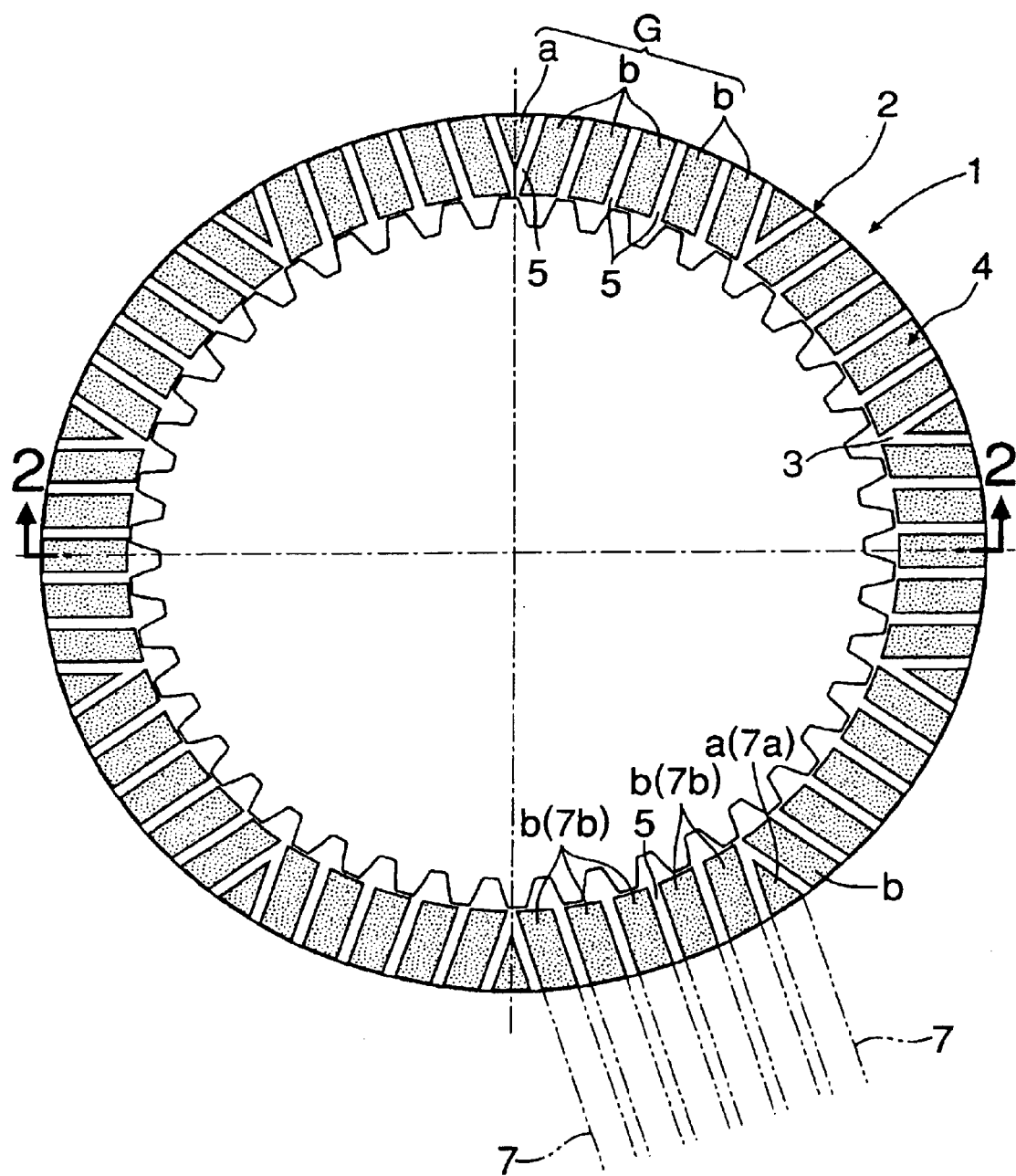
FIG. 1 is a plan view of a friction plate according to the present invention.
Figure 2:
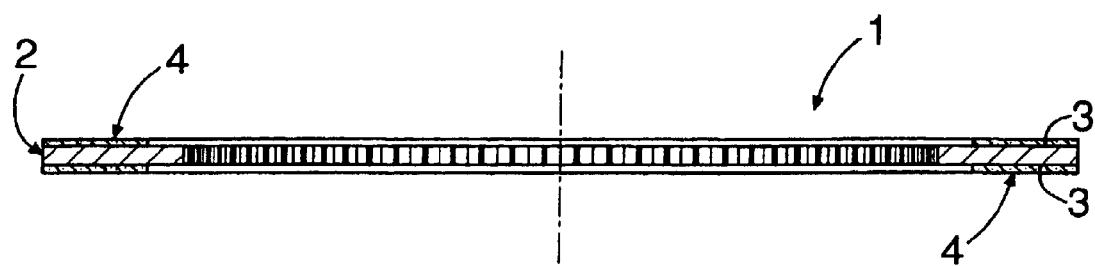
FIG. 2 is a sectional view taken on line 2—2 in FIG. 1.

Referring to FIGS. 1 and 2, a friction plate 1 for a wet clutch includes an annular core plate 2 made of a metal, and a friction member 4 formed from a fiber component, an additional component, a binder and the like and bonded to at least one annular flat surface 3 of the annular core plate 2, e.g., to opposite annular flat surfaces 3 in the present embodiment. Each of the friction members 4 comprises a plurality of friction member segments disposed on the annular flat surface 3. In the present embodiment, each of the friction members 4 comprises ten sets of segment groups G, each of which comprises a single triangular friction member segment a and five rectangular friction member segments b arranged in a clockwise direction in FIG. 1 from the segment a. An oil groove 5 is provided between the adjacent friction member segments a and b or b and b.

To manufacture each of the friction members 4, the plurality of friction member segments a and b, namely, the segments of one group G are bonded simultaneously to the one annular flat surface 3 of the annular core plate 2, and the same bonding operation is then repeated nine times.

The manufacture of the friction plate 1 will be described in detail.

Figure 3:
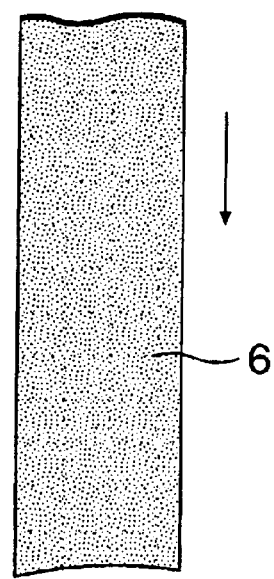
FIG. 3 is a plan view of an essential part of a band-shaped friction member material.

(a) A single band-shaped friction member material 6 is delivered from a friction member material roll (not shown), as shown in FIG. 3. In this case, a tip end edge of the friction member material 6 is formed in advance into an arcuate shape, so that it is substantially matched to an outer peripheral edge of the core plate 2.

Figure 4:
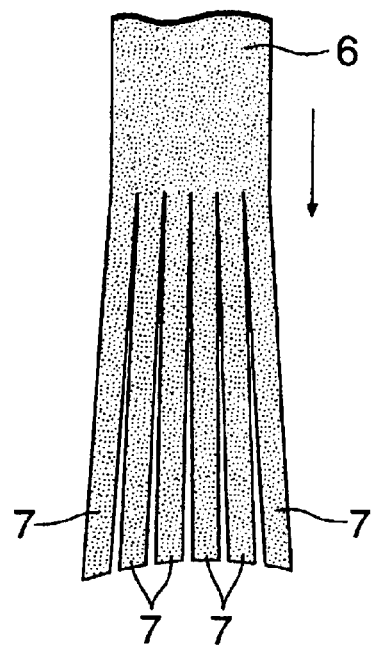
FIG. 4 is a plane view showing a state in which a plurality of friction member strips have been formed from the band-shaped friction member material.

(b) Five cuts are made in a lengthwise direction in the band-shaped friction member material 6, as shown in FIG. 4, using a cutter (not shown) comprising a plurality of, e.g., five (in the embodiment) slitters arranged in parallel, thereby forming six friction member strips 7. The cutter is not limited to the one comprising slitters.

Figure 5:
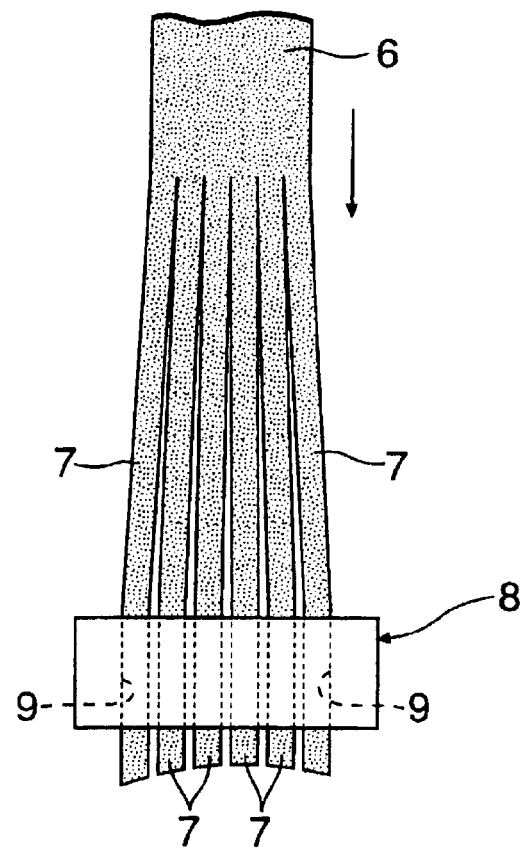
FIG. 5 is a plan view showing the relationship between the plurality of friction member strips and a distance-defining member.

(c) As shown in FIG. 5, the friction member strips 7 are passed through six through-bores 9 formed in a distance-defining member 8, whereby a distance corresponding to the oil groove 5 is formed between the adjacent friction member strips 7, and this state is maintained.

Figure 6:
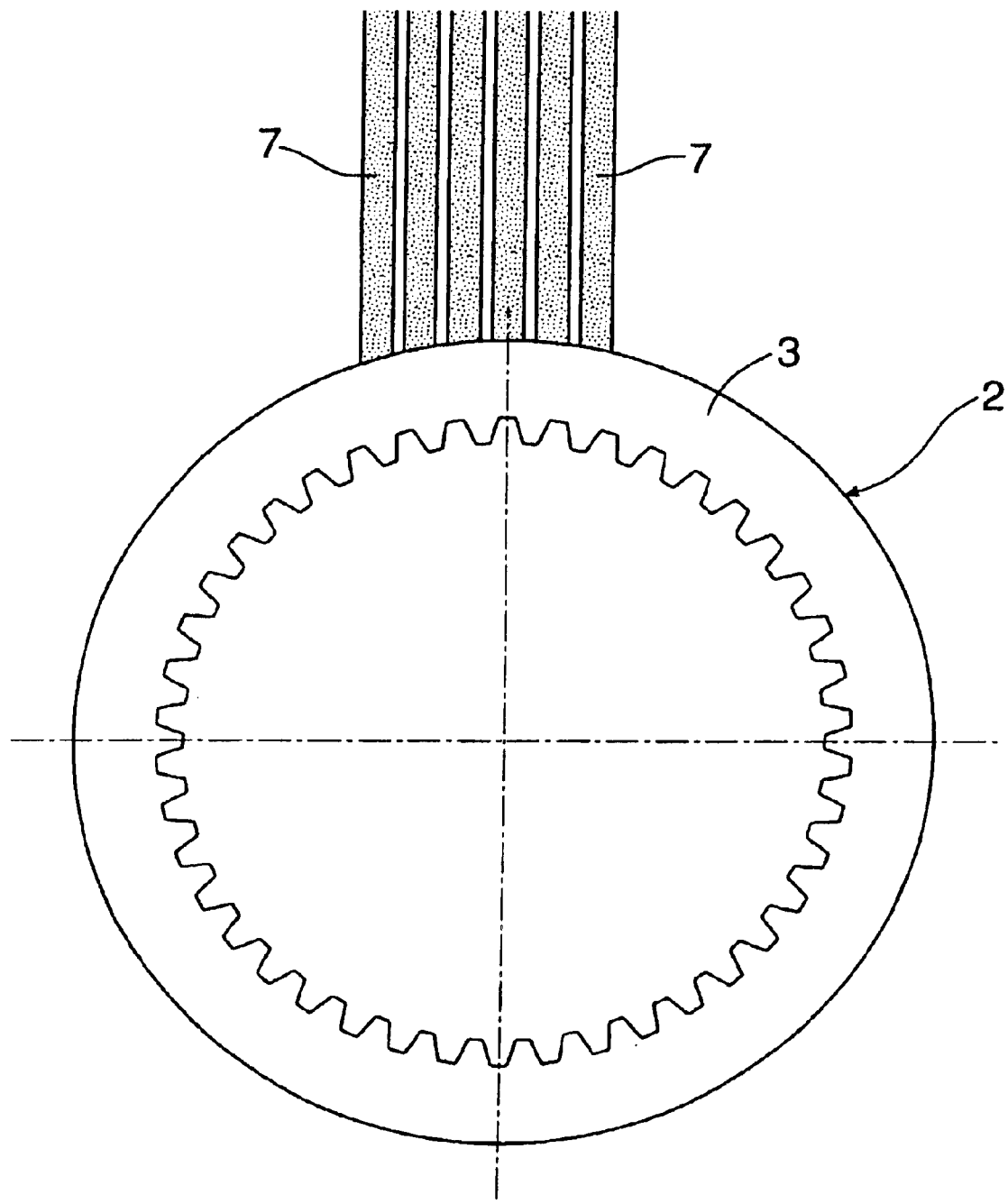
FIG. 6 is a plan view showing the relationship between the core plate and the plurality of friction member strips.

(d) As shown in FIG. 6, when tip ends of the six friction member strips 7 reach the vicinity of an outer peripheral surface of the annular core plate 2 placed on a turn table (not shown), the movement of the friction member strips 7 is stopped.

Figure 7:
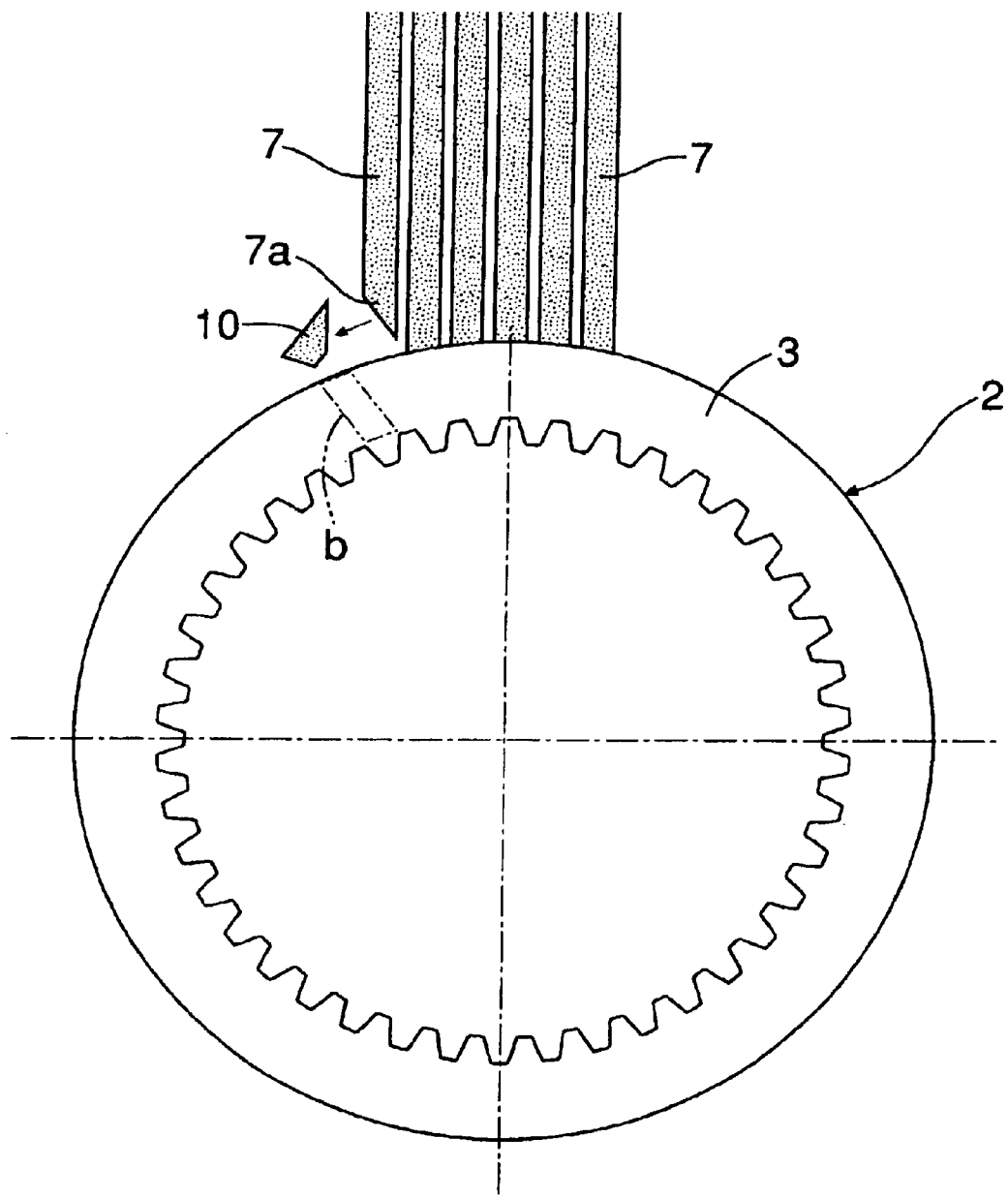
FIG. 7 is a plan view showing a state in which a portion of a tip end of one friction member strip has been cut off.

(e) As shown in FIG. 7, a portion of at least one of the friction member strips 7 which are located at opposite ends, namely, the one at a left end in FIG. 7, is cut off obliquely over the entire width (width: a circumferential length of the core plate 2) by a cutting edge of a cutter (not shown), to thereby secure an oil groove 5 between such a portion and the rectangular friction member segment b on the annular flat surface 3. This produces a trapezoidal scrap 10.

Figure 8:
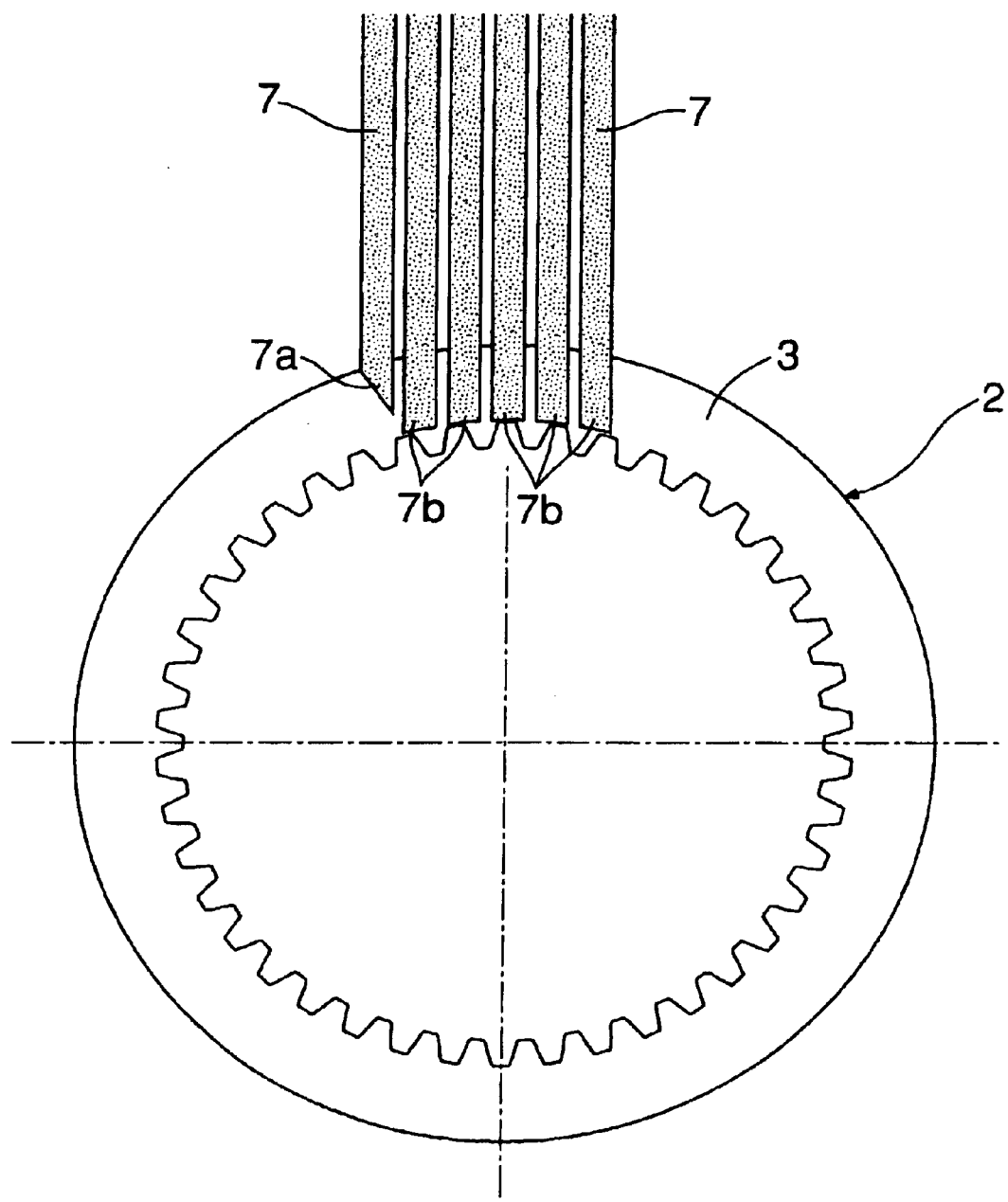
FIG. 8 is a plan view showing a state in which friction member segment correspondence portions of the friction member strips have been superposed on the core plate.

(f) As shown in FIG. 8, one friction member segment correspondence portions 7a formed by the above-described cutting-off and five friction member segment correspondence portions 7b of an original shape are superposed on the annular flat surface 3 of the core plate 2 having an adhesive applied thereto, the portions 7a and 7b forming tip ends of the six friction member strips 7.

(g) The friction member segment correspondence portions 7a and 7b are retained by a retaining member of a cutter (not shown), and cut away from the remaining portions of the friction member strips 7 by a cutting treatment along the outer peripheral edge of the core plate 2, thereby providing one segment group G comprising a single triangular friction member segment a formed by the above-described cutting-off and five rectangular friction member segments b having the original shape.

Figure 10:
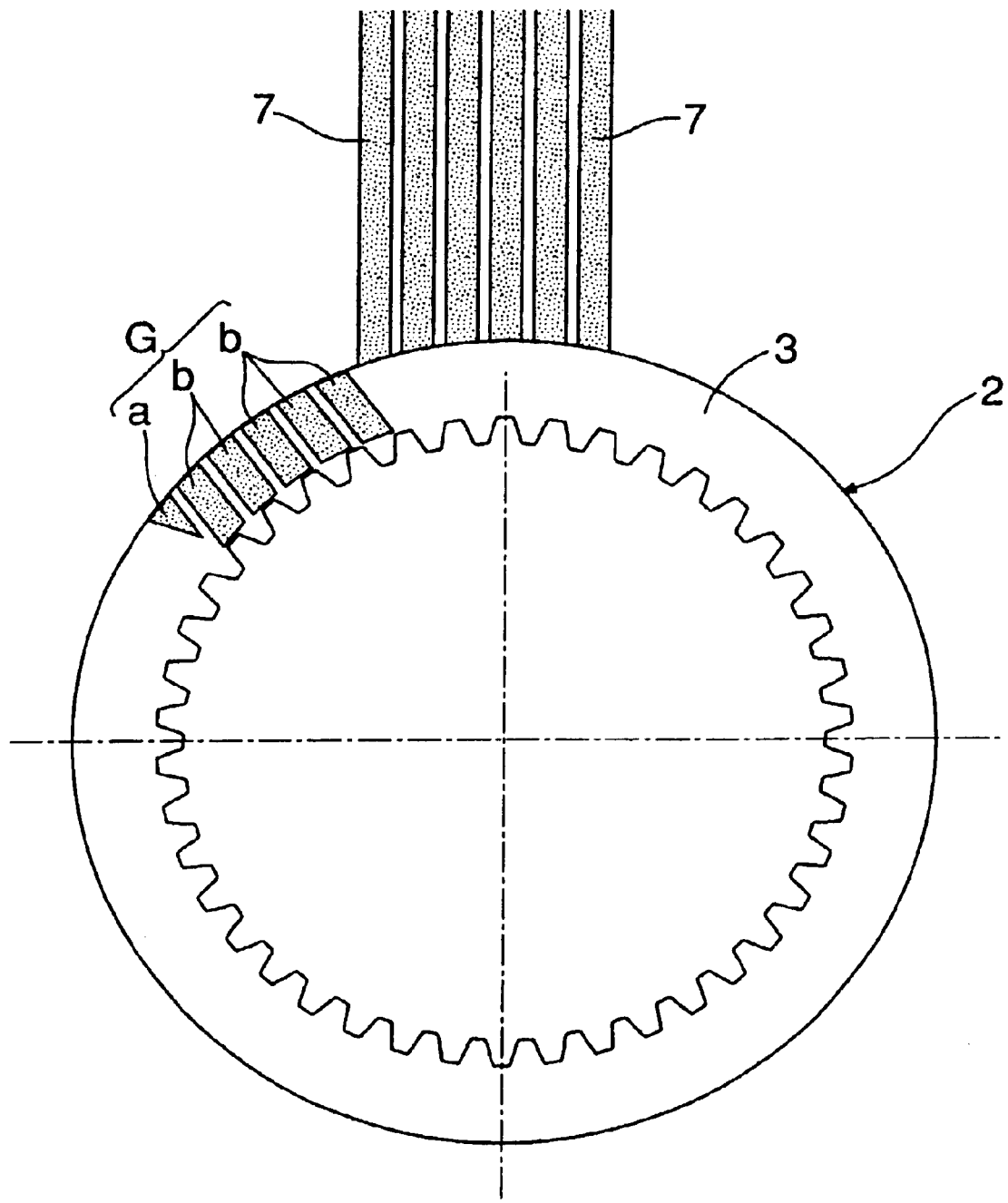
FIG. 10 is a plan view showing a state in which the core plate has been rotated through 36°.

(h) As shown in FIG. 10, the core plate 3 is rotated through 36° in a counterclockwise direction.

Figure 11:
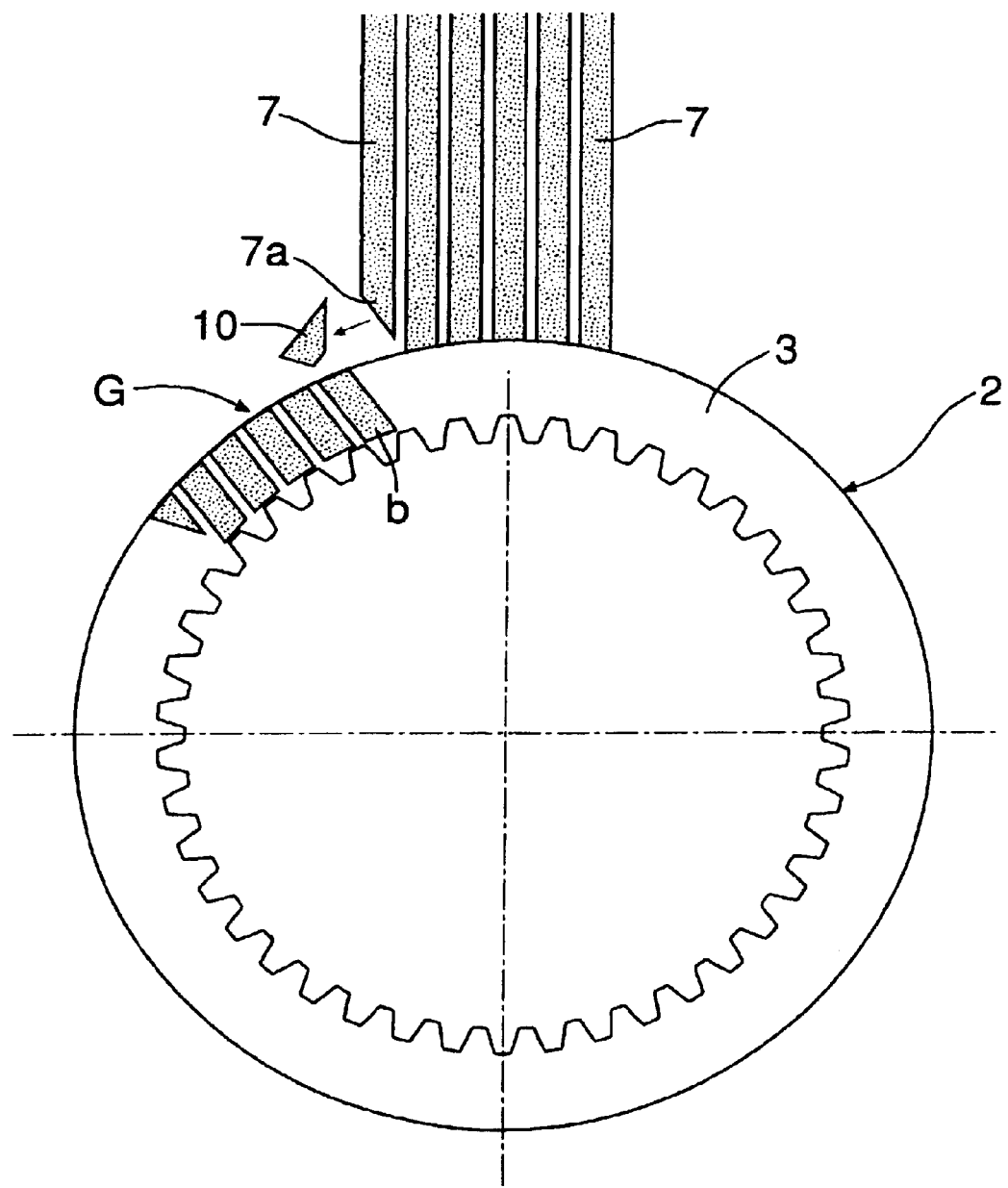
FIG. 11 is a plan view showing a state in which a portion of a tip end of one friction member strip has been cut off.

(i) As shown in FIG. 11, a portion of the tip end of the friction member strip 7 located at a left end is cut off obliquely over the entire width, as at the step (e) in FIG. 7.

Figure 12:
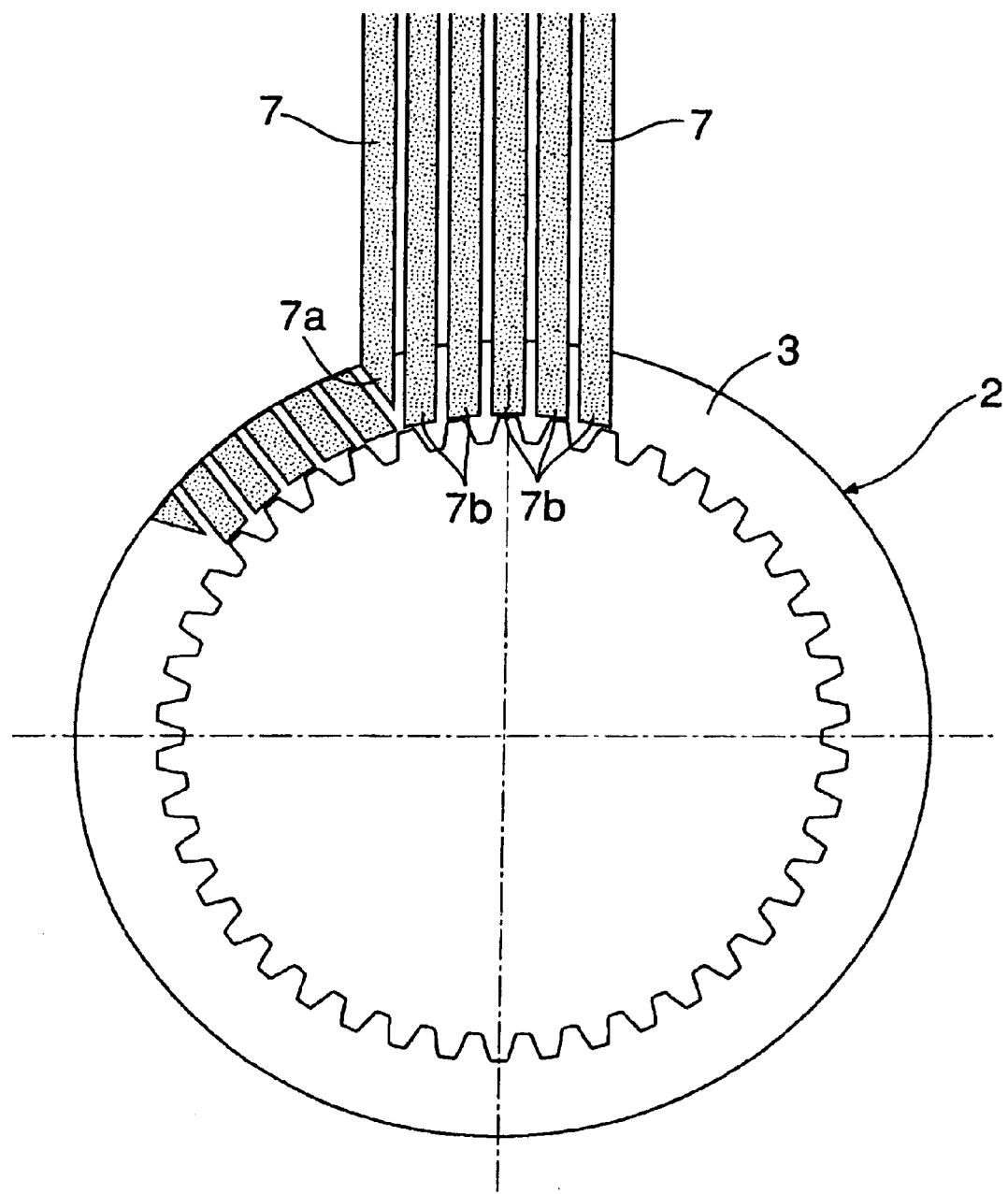
FIG. 12 is a plan view showing a state in which the friction member segment correspondence portions of the friction member strips have been superposed on the core plate.

(j) As shown in FIG. 12, the friction member segment correspondence portions 7a and 7b of the six friction member strips 7 are superposed on the annular flat surface 3 of the core plate 2 having the adhesive applied thereto, as at the step (f) in FIG. 8.

Figure 9:
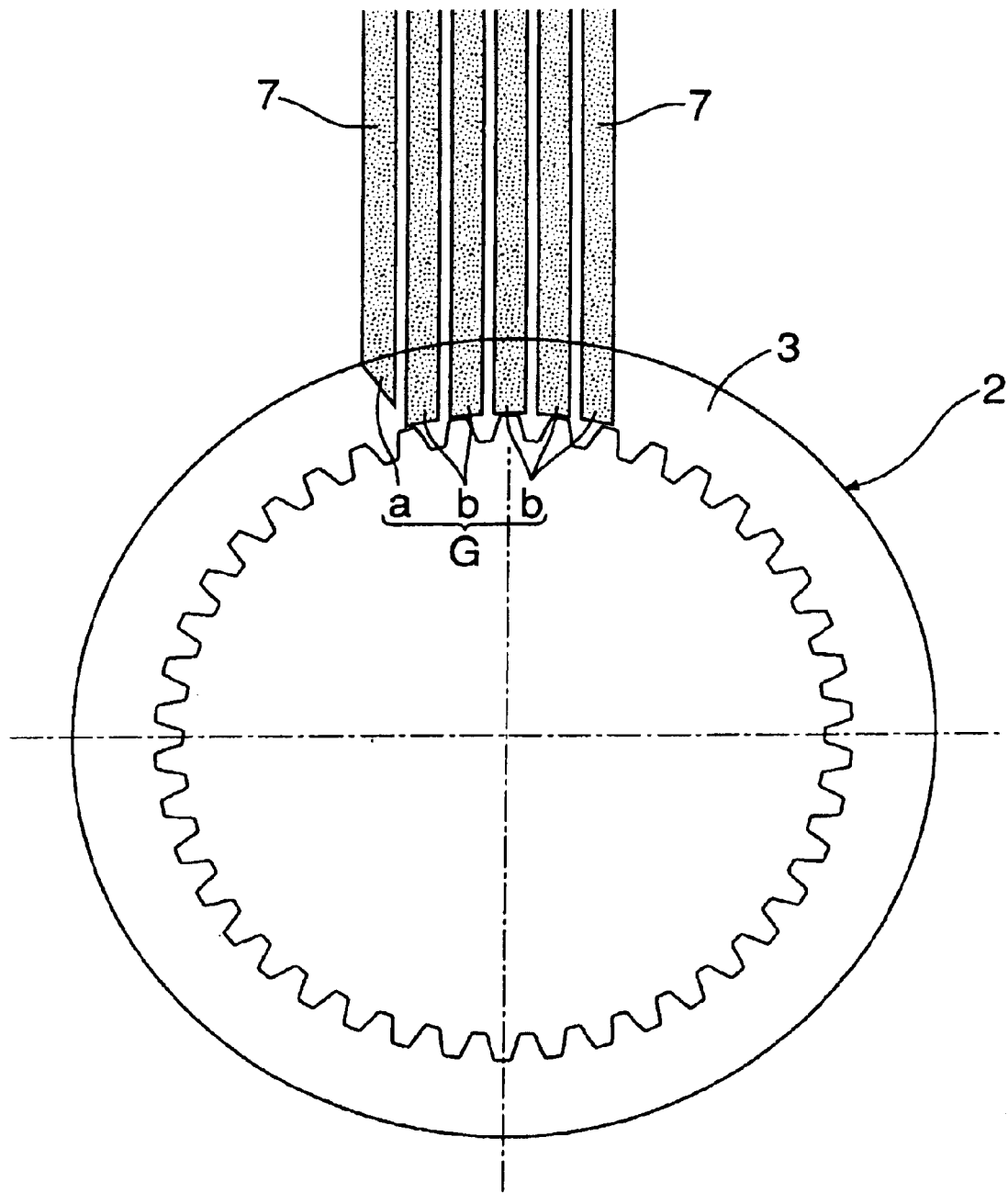
FIG. 9 is a plan view showing a state in which the friction member segment correspondence portions have been cut away from the remaining portions of the friction member strips.
Figure 13:
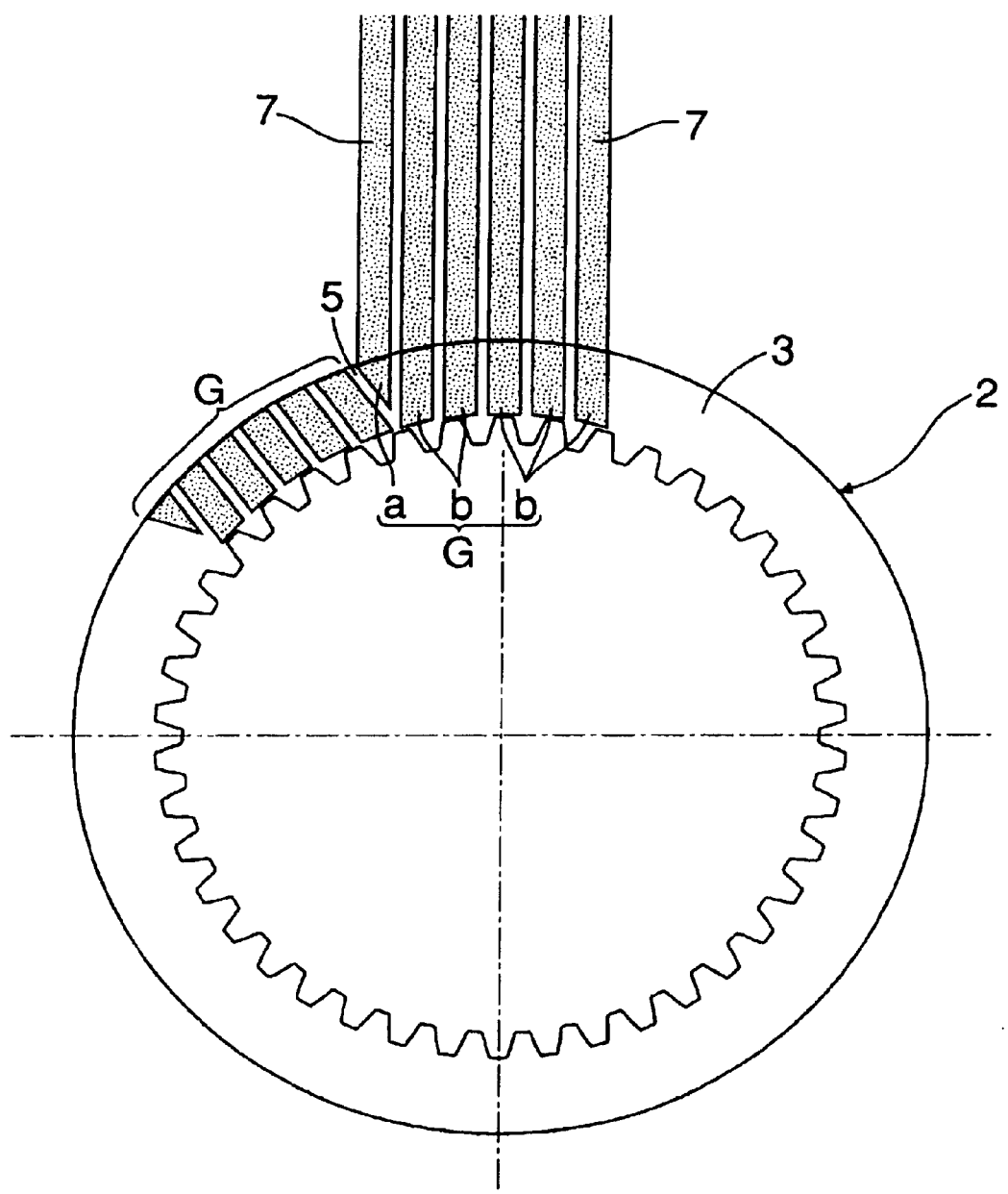
FIG. 13 is a plan view showing a state in which the friction member segment correspondence portions have been cut away from the remaining portions of the friction member strips.

(k) As shown in FIG. 13, the friction member segment correspondence portions 7a and 7b are retained by the retaining member, and the friction member strips 7 are subjected to a cutting treatment along the outer peripheral edge of the core plate 2 by the cutting edge, as at the step (g) in FIG. 9, thereby providing a second segment group G comprising a single triangular friction member segment a and five rectangular friction member segments b.

Thereafter, the steps (h) to (k) in FIGS. 10 to 13 are repeated eight times to form a friction member 4 on one side, and subsequently, the formation of a friction member 4 on the other side is carried out by the same way.

If the cutting for forming the friction member strips 7, the cutting-off for securing the oil grooves 5 and the cutting-away of the friction member segment correspondence portions 7a and 7b from the remaining portions of the friction member strips 7 are carried out using the cutting edge, as described above, the produced scraps 10 can be limited to those produced by the cutting-off in fabrication of the friction member segments a and b from the band-shaped friction member material 6, whereby the yield in the fabrication of the friction member segments a and b can be increased.

The other embodiments will be described below.

Figure 14:
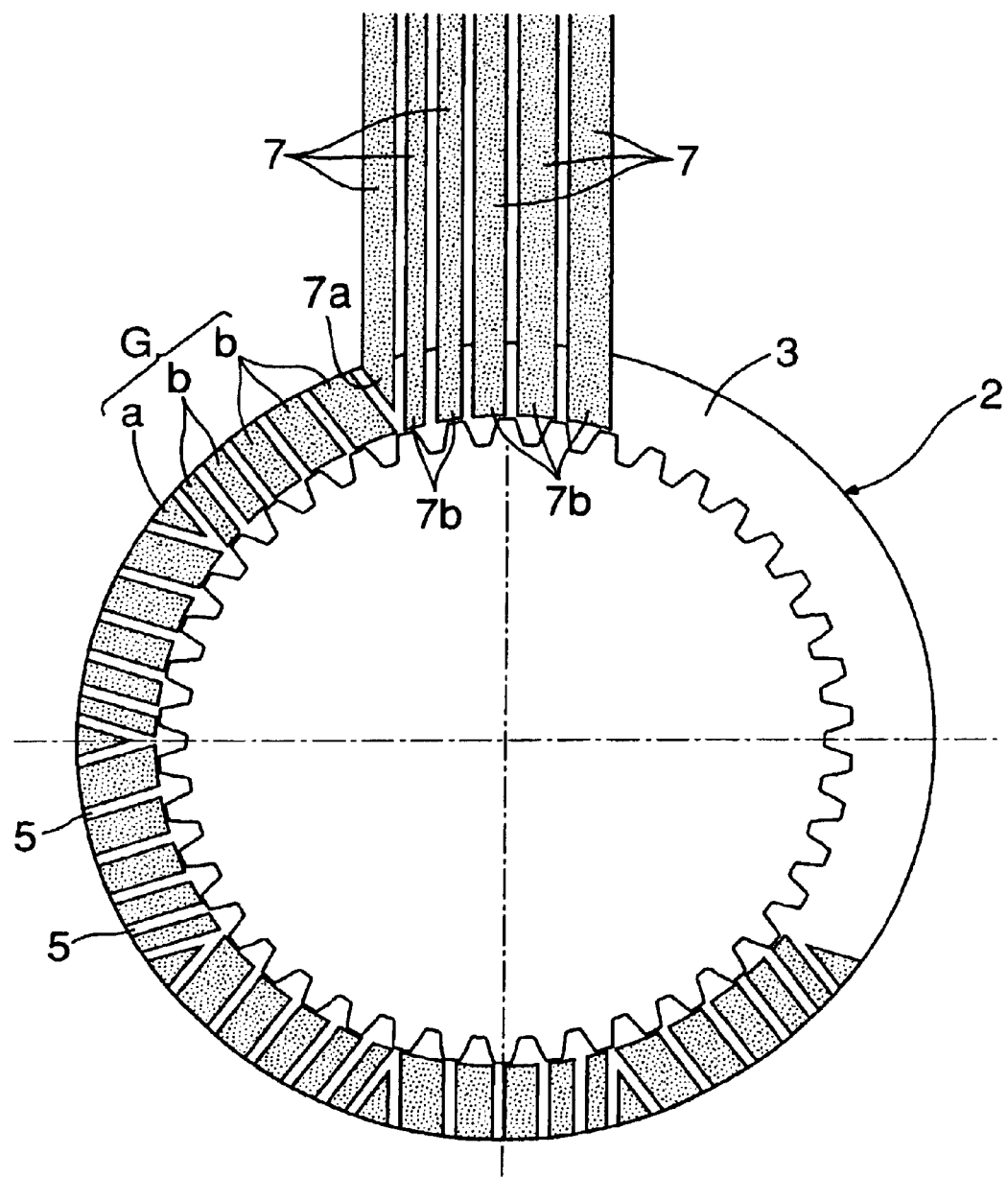
FIG. 14 is a plan view showing a state in which, when changing the widths of the plurality of friction member segments, the friction member segment correspondence portions of the friction member strips have been superposed on the core plate.

In an embodiment shown in FIG. 14, the width (the circumferential length) of each of five rectangular friction member segments b in each of segment groups G is larger at a location more apart from the triangular friction member segment a. This is achieved by changing the width of the friction member strip 7.

Figure 15:
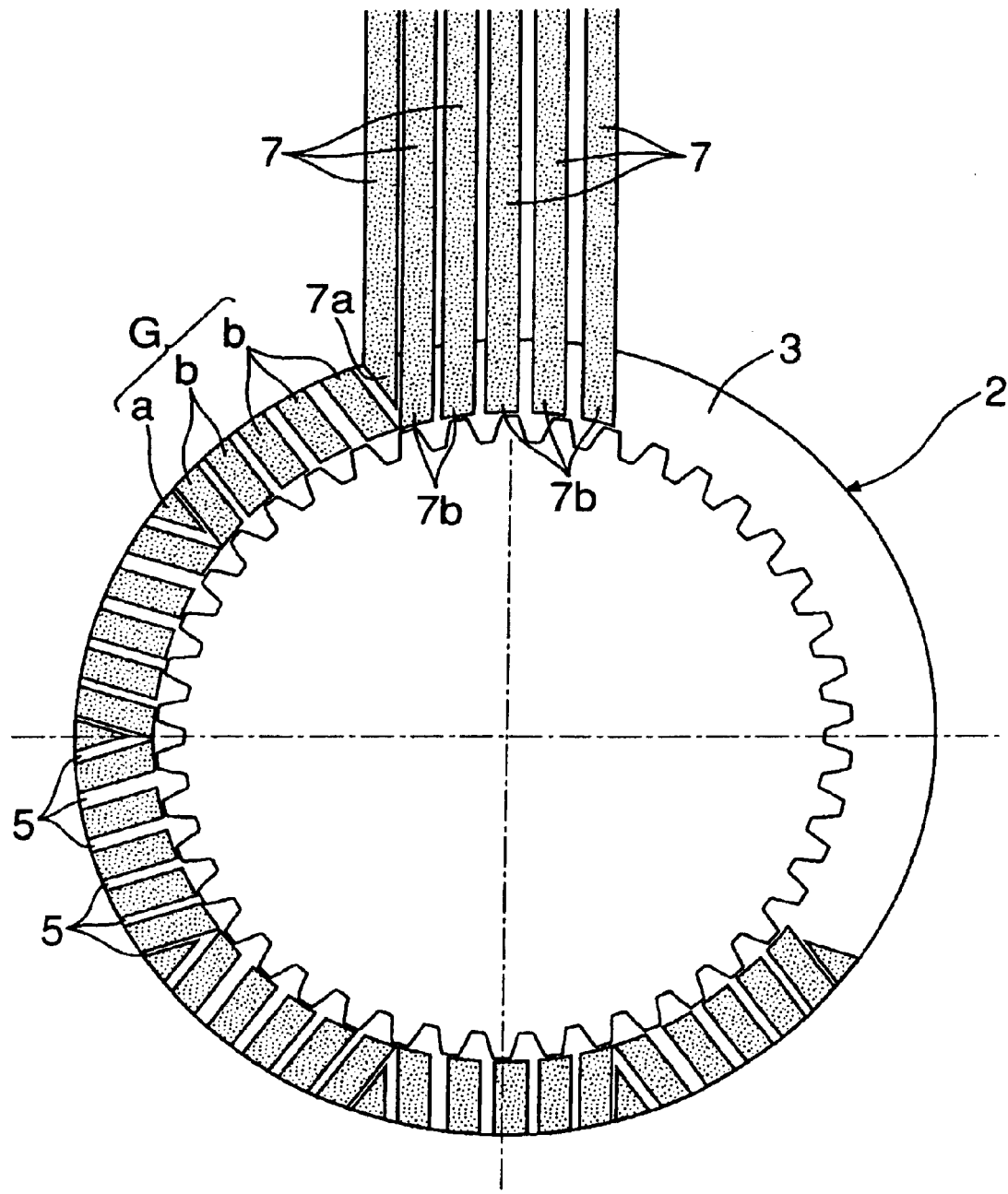
FIG. 15 is a plan view showing a state in which, when changing the widths of oil grooves, the friction member segment correspondence portions of the friction member strips have been superposed on the core plate.

In an embodiment shown in FIG. 15, the width (circumferential length) of an oil groove 5 between a triangular friction member segment a and a rectangular friction member segment b adjacent thereto in each of segment groups G is smallest, and the width of each of the other grooves 5 is larger at a location more apart from the triangular friction member segment a. This is achieved by changing the distance between the adjacent friction member strips 7.

Figure 16:
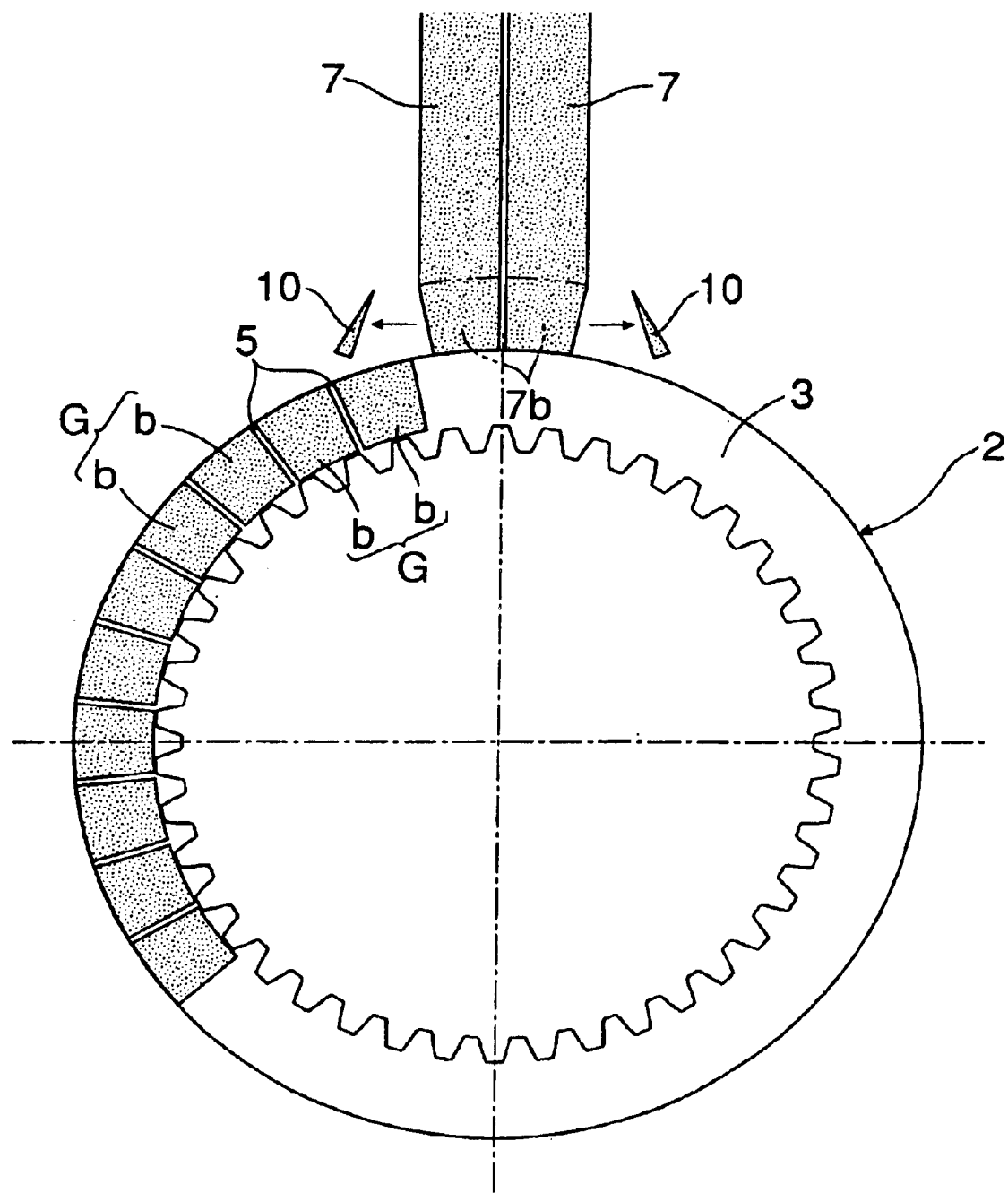
FIG. 16 is a plan view showing a state in which, when using two friction member strips, a portion of a tip end of each of the friction member strips has been cut off.

In an embodiment shown in FIG. 16, two friction member strips 7 are used, and a portion of each of tip ends of the friction member strips 7, namely, an outer corner is cut off to secure an oil groove 5, whereby two triangular scraps 10 are produced. In this case, two friction member segment correspondence portions 7b form two rectangular friction member segments b, which form one segment group G. The two friction member strips 7 correspond to ones at opposite ends in the plurality of strip-shaped frictions.

Figure 17:
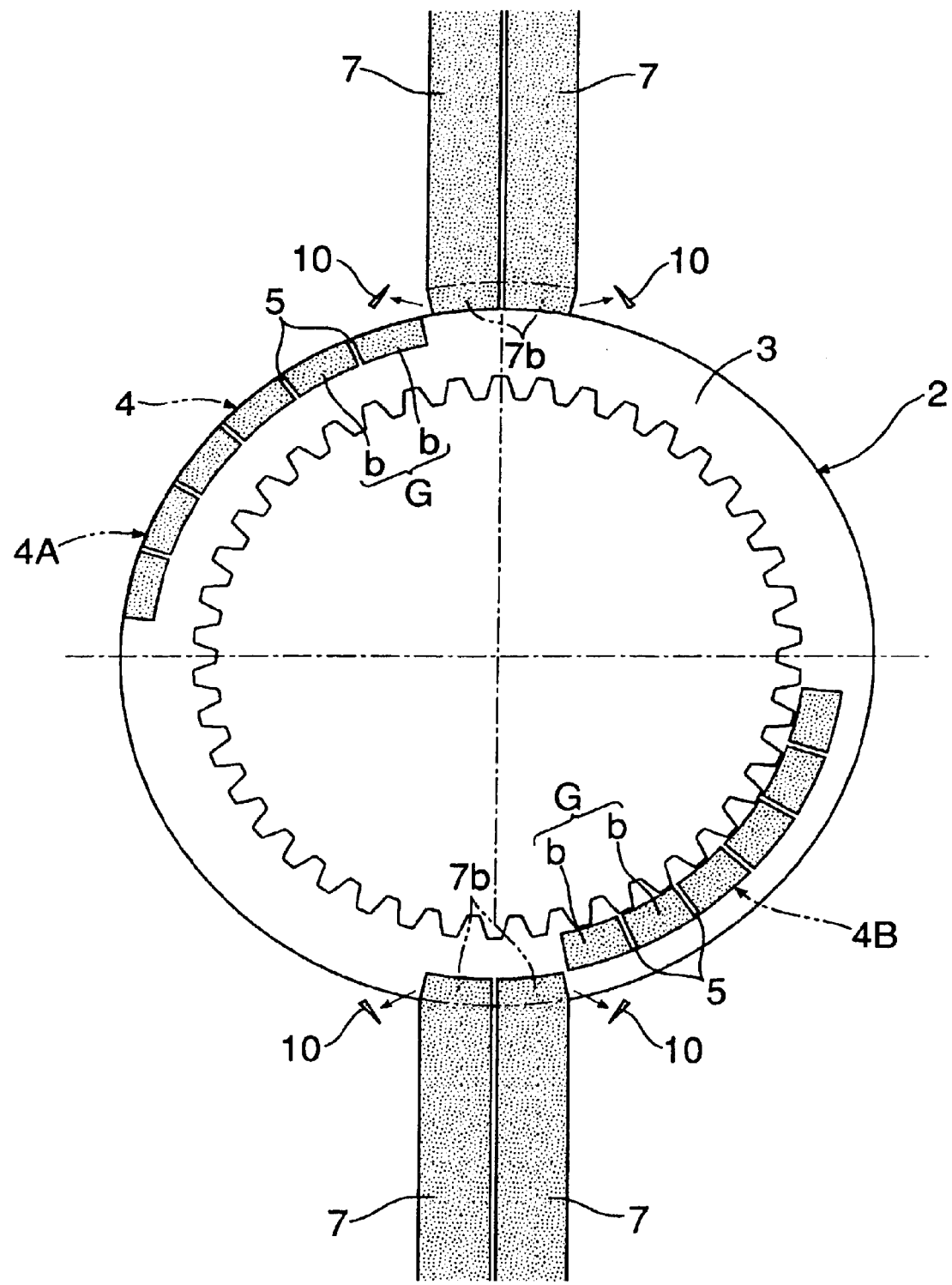
FIG. 17 is a plan view showing a state in which, when using two sets of friction member strips, each set comprising two friction member strips, a portion of a tip end of each of the friction member strips has been cut off.

In an embodiment shown in FIG. 17, a friction member 4 is divided into an outer peripheral half 4A and an inner peripheral half 4B. The formation of the outer peripheral half 4A is carried out using two friction member strips 7, and the formation of the inner peripheral half 4B is carried out using two friction member strips 7. In this case, a portion of a tip end of each of the friction member strips 7 is cut off to secure an oil groove 5, as in the embodiment shown in FIG. 16. However, the above-described cutting-off and the cutting-away of each friction member segment correspondence portions 7b in the formation of the inner peripheral half 4B are carried out on the core plate 2 using the cutting edge.

Figure 18:
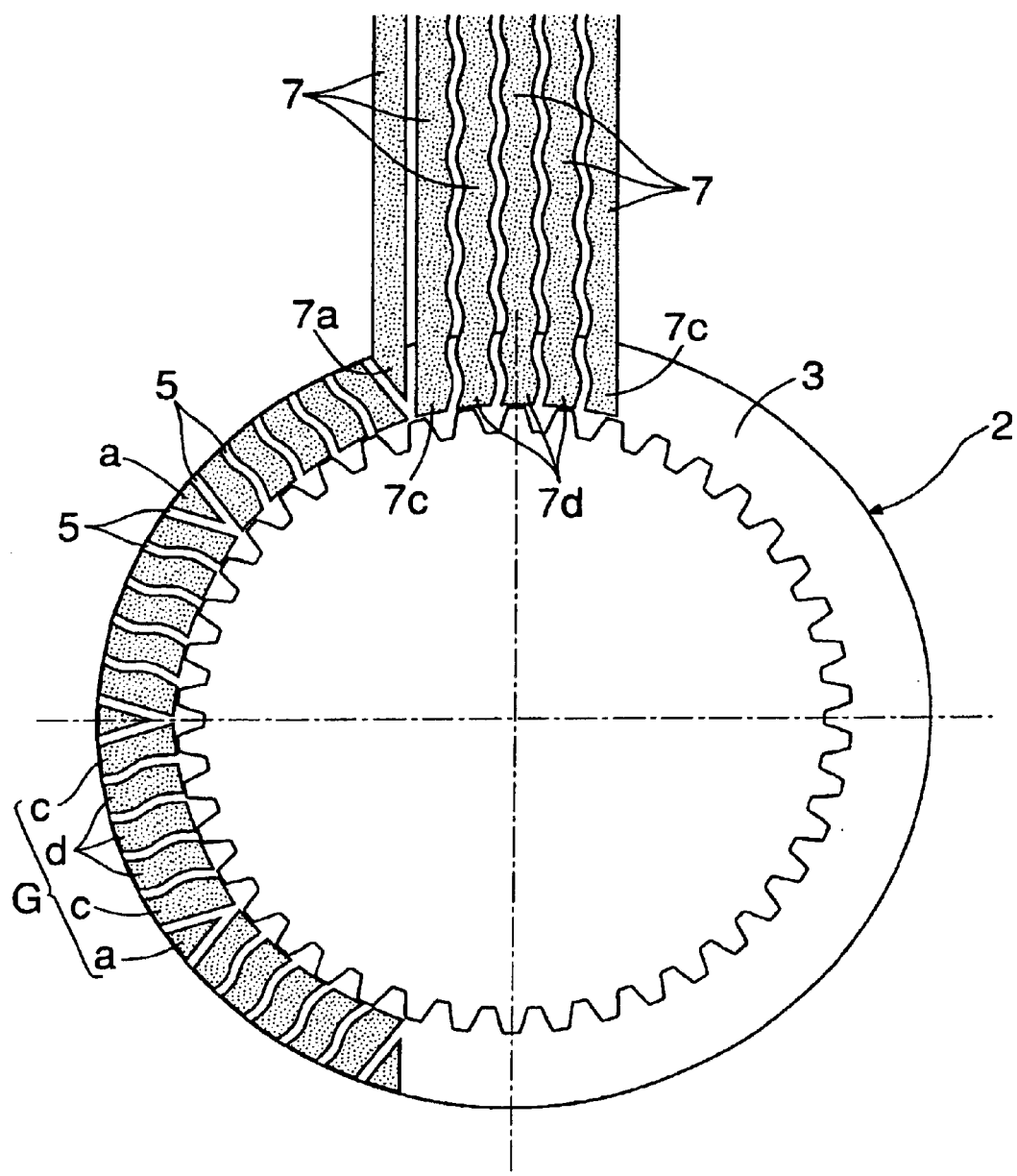
FIG. 18 is a plan view showing a state in which, when using a plurality of friction member strips having corrugated cuts made therein, friction segment correspondence portions thereof have been superposed on the core plate.

In an embodiment shown in FIG. 18, corrugated cuts are provided in order to form friction member strips 7 for forming segments other than a triangular friction member segment a, whereby each of oil grooves 5 excluding oil grooves 5 on opposite sides of the triangular friction member segment a obtains a winding shape. The winding oil grooves 5 obstruct the discharge of an oil, and hence the clutch is easy to release, leading to a reduction in drag. In this case, one segment group G comprises a single triangular friction member segment a, two deformed friction member segments c having one side curved in an S-shape, and three S-shaped deformed friction member segments d. In FIG. 18, 7c and 7d are friction member segment correspondence portions.

Figure 19:
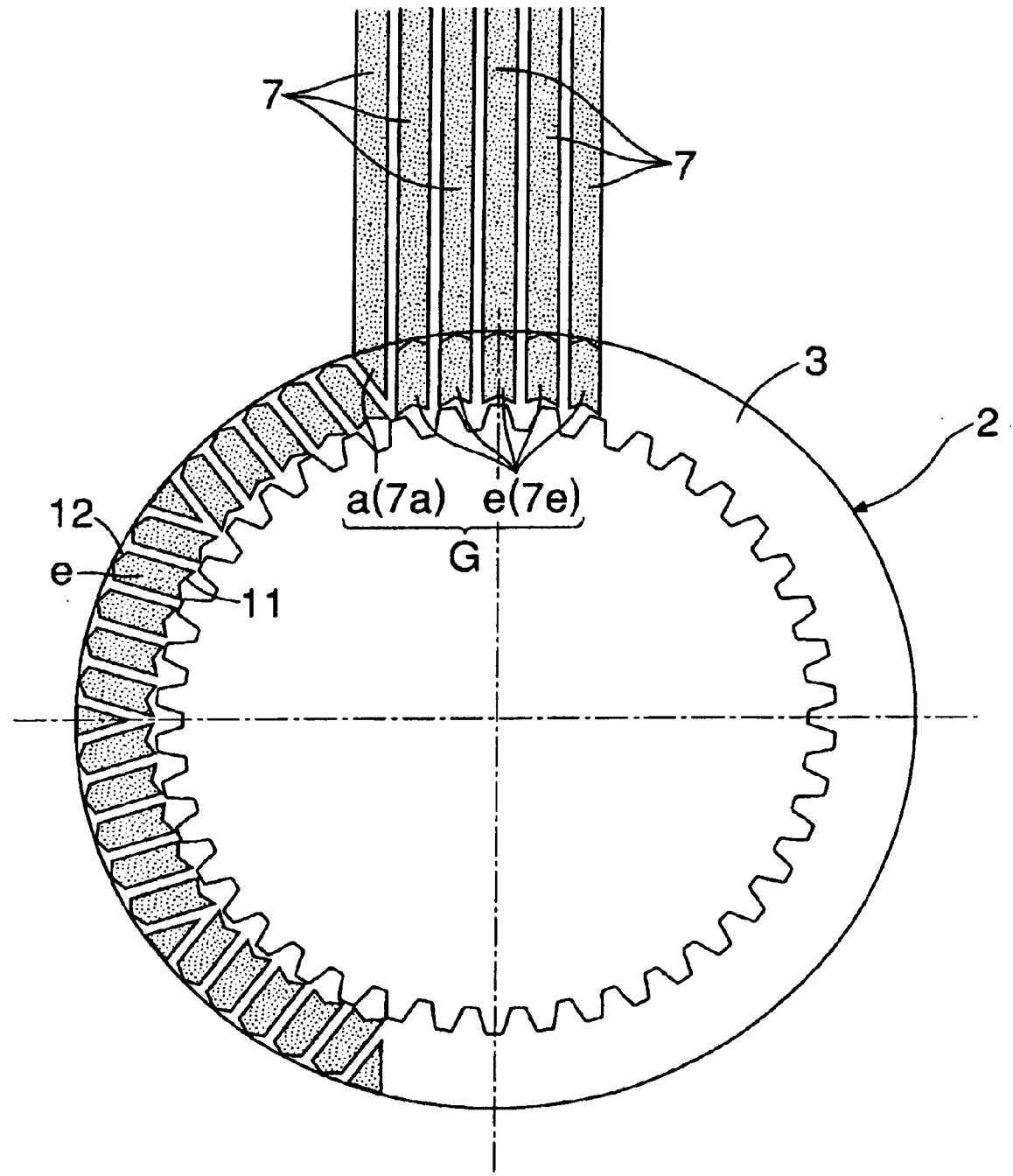
FIG. 19 is a plan view showing a state in which friction member segment correspondence portions of a plurality of friction member strips have been superposed on a core plate to form segment groups each including a plurality of arrow-feather-shaped friction segments in a modified shape.

In an embodiment shown in FIG. 19, each of deformed friction member segments e excluding a triangular friction member segment a is formed into an arrow-feather-shape, so that a face turned radially inwards is a V-shaped concave face 11, and a face turned radially outwards is a V-shaped convex face 12. The deformed friction member segments e each having the arrow-feather-shape obstruct the discharge of the oil and hence, the drag of the clutch is reduced. In FIG. 19, 7e is a friction member segment correspondence portion.

Figure 20:
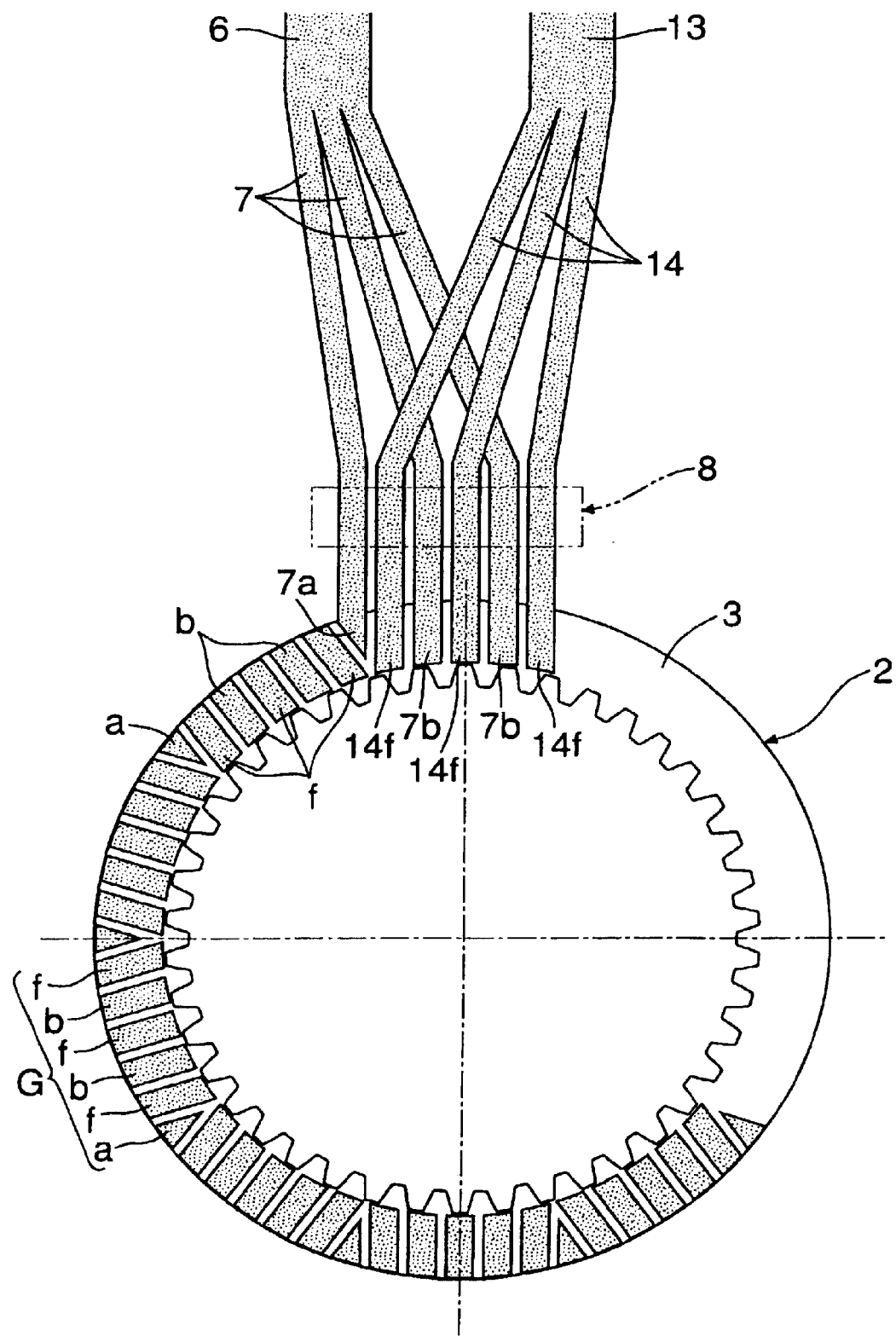
FIG. 20 is a plan view showing a state in which, when using two different types of band-shaped friction member materials, friction member segment correspondence portions of the two types of pluralities of friction member strips have been alternately superposed on a core plate.

In an embodiment shown in FIG. 20, two types of friction member strips 7 and 14 formed of two different types of band-shaped friction member materials 6 and 13 are used, and one type of triangular and rectangular friction member segments a and b and the other type of rectangular friction member segments f are alternately disposed on each of flat annular surfaces 3. Such a friction plate 1 is demanded, for example, in a wet clutch disclosed in Japanese Patent Application Laid-open No. 2-3716. In FIG. 20, 14f designates a friction member segment correspondence portion.

Figure 21:
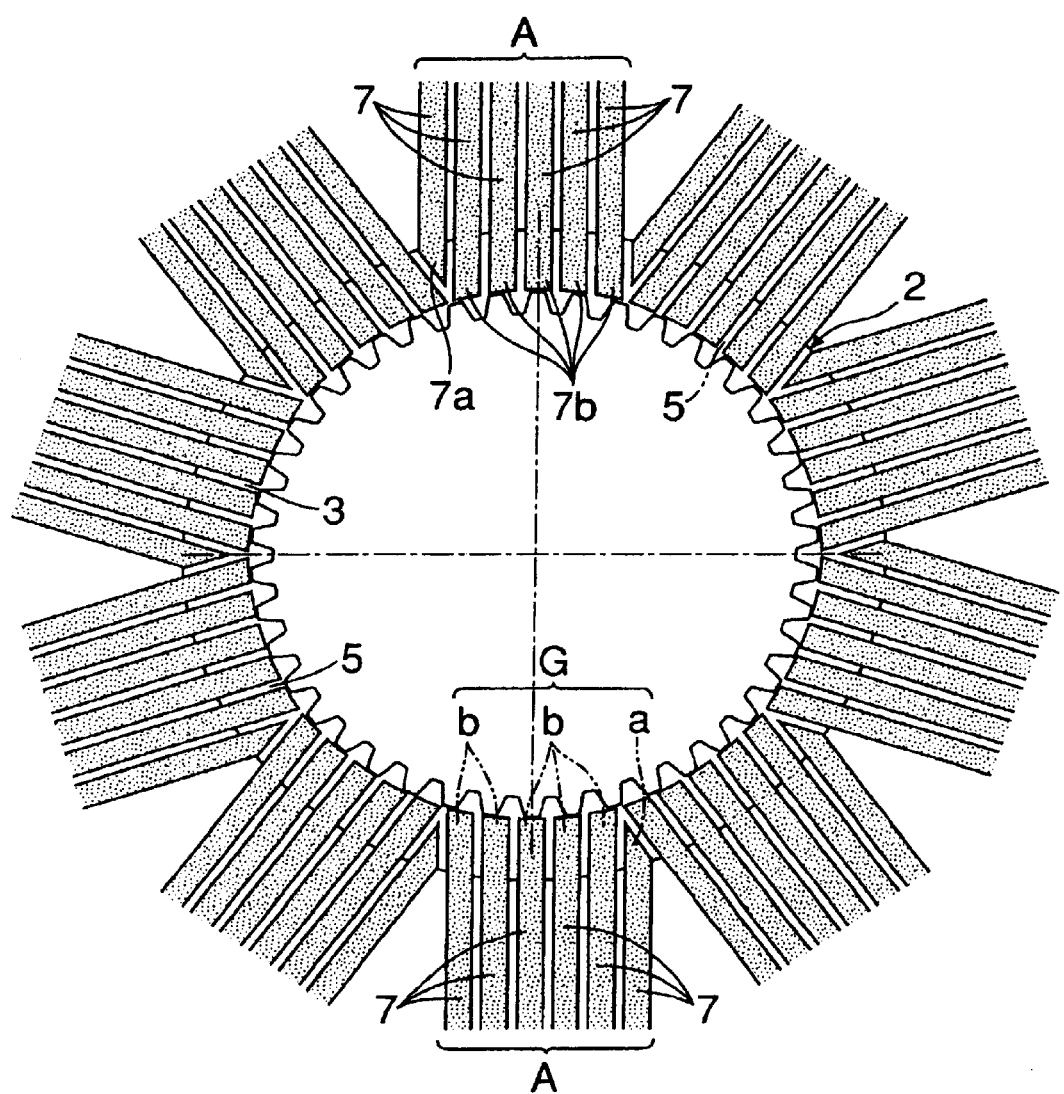
FIG. 21 is a plan view showing a state in which, when forming a friction member on one side by one run of a bonding operation, a plurality of assemblies of friction member segment correspondence portions each comprising a plurality of friction member strips have been superposed on a core plate.

An embodiment shown in FIG. 21 corresponds to a modification of the embodiments shown in FIG. 1 to 13. More specifically, six friction member strips 7 constitute one assembly A. Friction member segment correspondence portions 7a and 7b in ten assemblies A are equally disposed on one of annular flat surfaces 3 of a core plate 2, and ten segment groups G are bonded simultaneously. Therefore, a friction member 4 on one side is formed by one run of a bonding operation. If such a means is adopted, the accuracy of the positions of the segment groups G can be enhanced easily.

The friction plate 1 according to the present invention may be a friction plate including a friction member 4 on only one of annular flat surfaces 3 of a core plate 2.

Although the embodiments of the present invention have been described in detail, it will be understood that the present invention is not limited to the above-described embodiments, and various modifications in design may be made without departing from the subject matter of the invention defined in the claims.

What is claimed is:

1. A method of manufacturing a friction plate for a wet clutch which includes an annular core plate and a friction member bonded to at least one of annular flat surfaces of the annular core plate, each friction member comprising a plurality of friction member segments disposed on the annular flat surface, an oil groove being provided between adjacent friction member segments, wherein the following steps are adopted to bond the plurality of friction member segments simultaneously to the annular flat surface of the annular core plate: a step of making a plurality of cuts in at least one band-shaped friction member material in a lengthwise direction to form a plurality of friction member strips; a step of retaining the friction member strips with distances therebetween corresponding to the oil grooves being formed between adjacent friction member strips; a step of cutting off a portion of a tip end of at least one of the friction member strips which are located at opposite ends of the friction member material to thereby provide the oil grooves between the friction member segments on the annular flat surface; and a step of superposing friction member segment correspondence portions forming the tip ends of the plurality of friction member strips to the annular flat surface of the core plate having an adhesive applied thereto, and cutting the friction member segment correspondence portions away from the remaining portions of the friction member strips.

* * * * *